US011808688B2

(12) United States Patent
Kiselev et al.

(10) Patent No.: US 11,808,688 B2
(45) Date of Patent: Nov. 7, 2023

(54) METHOD AND DEVICE FOR DETECTION AND/OR MEASUREMENT OF IMPURITIES IN DROPLETS

(71) Applicant: Plair SA, Perly (CH)

(72) Inventors: Denis Kiselev, Perly (CH); Fabio Capela, Perly (CH)

(73) Assignee: Plair, SA, Perly (CH)

( * ) Notice: Subject to any disclaimer, the term of this patent is extended or adjusted under 35 U.S.C. 154(b) by 152 days.

(21) Appl. No.: 17/287,697

(22) PCT Filed: Oct. 25, 2018

(86) PCT No.: PCT/EP2018/079347
§ 371 (c)(1),
(2) Date: Apr. 22, 2021

(87) PCT Pub. No.: WO2020/083500
PCT Pub. Date: Apr. 30, 2020

(65) Prior Publication Data
US 2021/0404942 A1 Dec. 30, 2021

(51) Int. Cl.
*G01N 15/14* (2006.01)
*G01N 21/53* (2006.01)
(Continued)

(52) U.S. Cl.
CPC ..... *G01N 15/1434* (2013.01); *G01N 15/1459* (2013.01); *G01N 21/53* (2013.01);
(Continued)

(58) Field of Classification Search
CPC ............................................ G01N 2015/1481
See application file for complete search history.

(56) References Cited

U.S. PATENT DOCUMENTS 5,270,548 A   12/1993   Steinkamp
5,315,122 A   5/1994    Pinsky et al.
(Continued)

FOREIGN PATENT DOCUMENTS

DE   102004007405 A1 * 10/2004   ............. G01J 11/00
JP   2004522163        * 7/2004
WO   WO-2017174977 A1 * 10/2017

OTHER PUBLICATIONS

Hug et al., "Deep Ultraviolet Laser Diode for UV-Resonance Enhanced Rama Identification of Biological Agents", Photon Systems, Inc., DARPA SBIR Phase 1, Jun. 1, 2003.
(Continued)

*Primary Examiner* — Rufus L Phillips
(74) *Attorney, Agent, or Firm* — Dinsmore & Shohl LLP

(57) ABSTRACT

The present relates to a measurement device (1) for the detection and/or measurement of particles in a fluid, the measurement device comprising a fluid source (11) for producing a flow of fluid (111) along a fluid flow path, a first laser source (12) positioned for emitting a first laser beam (120) of laser light in a measurement volume of the fluid flow path for light scattering; a scattered light detecting means (13) for detecting a presence of a particle in the fluid flow path through detection and measurement of laser beam light scattered on different angles by said particle, wherein it further comprises a second laser source (14) positioned for emitting a second laser beam (140) of laser light in said measurement volume of the fluid flow path for Raman and fluorescence excitation; a Raman and fluorescence detecting means (15) for detecting a Raman scattering signal emitted by the fluid and a Fluorescence signal emitted by said particle upon excitation by said second laser beam (140).

14 Claims, 3 Drawing Sheets

(51) Int. Cl.
*G01N 21/64* (2006.01)
*G01N 21/65* (2006.01)
*G01N 15/06* (2006.01)

(52) U.S. Cl.
CPC ......... *G01N 21/6486* (2013.01); *G01N 21/65* (2013.01); *G01N 2015/0668* (2013.01); *G01N 2015/0693* (2013.01); *G01N 2015/1438* (2013.01); *G01N 2015/1481* (2013.01); *G01N 2015/1486* (2013.01)

(56) References Cited

U.S. PATENT DOCUMENTS

| | | | |
|---|---|---|---|
| 2009/0248342 A1 | 10/2009 | Hlavaty | |
| 2016/0169788 A1* | 6/2016 | Smith | B01L 3/502784 |
| | | | 435/5 |
| 2021/0041342 A1* | 2/2021 | Tahara | G01N 15/1012 |

OTHER PUBLICATIONS

Bazile et al., "Measurements of the Vaporization Dynamics in the Development Zone of a Burning Spray by Planar Laser Induced Fluorescence and Raman Scattering", Experiments in Fluids, 1994, 171-180.

International Search Report and Written Opinion pertaining to corresponding application PCT/EP2018/079347, dated Jul. 19, 2019.

* cited by examiner

METHOD AND DEVICE FOR DETECTION AND/OR MEASUREMENT OF IMPURITIES IN DROPLETS

CROSS REFERENCE TO RELATED APPLICATIONS

This application is a U.S. National Stage under 35 U.S.C. § 371 of PCT/EP2018/079347 filed Oct. 25, 2018.

TECHNICAL FIELD

The present invention relates to a method and a device for detection and/or measurement of impurities in droplets, more particularly, it relates to a method and a device for on-line measurement of organic impurities concentration in aerosolized water microdroplets. The described method and device of current invention are intended for on-the-fly and instantaneous detection of presence and concentration measurement of organic molecules or mixture of organic molecules in aerosols of water droplets.

BACKGROUND OF THE ART

The present invention relates to the field of precaution and/or protection means for detecting and/or characterizing fluid-borne particles, for example, but not exclusively, airborne particles such as air pollution, air bio- and chemical contamination and/or airborne allergen, water-borne particle such as water pollution, water bio- and chemical contamination, etc. The growing concentration of different types of aerosols in the atmosphere, for example the increasing number airborne pollens, becomes more and more an important public health issue. Moreover, new threats like bio-terrorism that employs airborne biological and chemical pathogens like anthrax or mustard gas as an arm of massive destruction have recently appeared. Reliable, operator-free and cost-effective detectors of fluid-borne particles, for example aerosol detectors, fast and with a high discrimination power, are thus highly desirable in the market. There is a need for detectors allowing a real-time detection of particles present in a particular fluid environment, for example in the atmosphere, in a watercourse, in a drinking water distribution system, etc.

Species of aerosol particles, like pollens and spores, have a large impact on human health. Some of them are responsible for health problems like allergies affecting, according to statistical analysis, about 20% of the European population.

The counting and identification of these particles is still done mostly manually under microscope. The size of airborne particles ranges from fractions of micrometer to some hundreds of micrometers, which brings an additional difficulty in particle detection and identification.

Measurement devices and methods for the detection of airborne particles exist, that allow estimating the size of particles contained in an aerosol based on the measurement of light scattered by individual particles. These devices and methods use a source of light (laser, laser diode, LED, etc.) directed to a flow of air, and a photodetector collecting light scattered by individual airborne particles over a large angle, or, in some cases, multiple or array detectors (1D or 2D) for collecting scattered light independently in different directions from the particle. The collected scattered light provides for a static representation of the airborne particle. The single-detector devices allow only very limited determination of single particle morphology, while the devices with multiple or array detectors usually allow a more precise determination of these parameters.

When particle chemistry is under investigation, the non-invasive methods like light scattering provide very few or no insight on particle composition. Some emerging invasive (destructive) methods like mass spectroscopy (MS), laser-induced breakdown spectroscopy (LIBS) or atomic emission spectroscopy (AES) provide a very good on-the-fly chemical analysis on molecular (for MS) and atomic (for LIBS and AES) levels. However, these methods, apart being invasive, suffer from several technical issues (limited particle size range, difficulty to operate in very polluted conditions, short continuous monitoring, cost, complex data output requiring expert knowledge, etc.) preventing from large deployment and cost reduction In the case of on-the-fly analysis of water embedded particles, the morphology cares almost no information about its nature of the embedded particle, since it will mostly tend to be perfect sphere due to the water. Use of MS, LIBS and AES will be influenced or disturbed by the presence of water since all these methods are based on evaporation of the airborne particle by a strong laser emission or a flame. The most promising results can be obtained by non-invasive methods that can probe the chemical composition like laser induced fluorescence or Raman scattering.

U.S. Pat. Nos. 5,270,548 and 5,315,122 for example describe apparatuses and methods for characterizing particles using, among ohers, time-resolved fluorescence of the particles following their submitting to laser light. A drawback of these apparatuses and methods is that the information that can be obtained about the nature and characteristics of individual particles is limited. In most of the cases, it only allows distinction between particles with slow fluorescence decay in the order of dozens of nanoseconds, generally attributed to non-biological particles containing hydrocarbons, against particles with short fluorescence decay in the order of a few nanoseconds or less, generally considered biological. Given only fluorescence decay, one can still find quite many molecular compositions that would give a false response in this bio- and non-bio-classification.

In this regard, a primary object of the invention is to solve the above-mentioned problems and more particularly to provide a device and a method allowing an on-the-fly and instantaneous detection of presence and concentration of organic molecules in aerosols water droplets with estimation of concentration.

Another aim of the present invention is to provide a device and a method for the cost-effective detection and/or characterization of individual fluid-borne particles with a much better identification of the chemical composition of individual particles and consequently a lower false count rate.

These aims, and other advantages are achieved with a device and a method according to the corresponding independent claims.

SUMMARY OF THE INVENTION

The method and device may find numerous applications in following fields such as drug manufacturing and quality control (measurement of drug dose concentration in sprays and aerosols); detection of organic impurities in water microdroplets (presence of *Legionella* bacteria in public bathrooms and hotel rooms), quality control for real-time viable particle detectors to be used in cleanrooms (as reference instrument to quantify detection thresholds and reaction time) and the like.

The above problems are solved by the present invention.

A first aspect of the invention is a measurement device for the detection and/or measurement of particles in a fluid, the measurement device comprising a fluid source for producing a flow of fluid along a fluid flow path, a laser source positioned for emitting a laser beam of laser light in a measurement volume of the fluid flow path for light scattering, a scattered light detecting means for detecting a presence of a particle in the fluid flow path through detection and measurement of laser beam light scattered on different angles by the particle.

Simultaneously, the mentioned laser source induces fluorescence and Raman emissions are resulted from the interaction of the laser light with molecules present in the particle. In this aspect, the intensity and wavelength of this laser beam as well as sensibility of all detectors are adjusted in a way to keep in optimal level all respective signal-to-noise ratios and simultaneously avoid saturation.

Preferably, in this regard, the laser light central wavelength is in a region from 200 to 400 nm to provide significant efficiency of photon absorption and thus high fluorescence emission. Moreover, Raman scattering efficiency is reversely proportional to the fourth power of the light wavelength, making the mentioned region the most convenient choice. The laser source wavelength spectrum width should be narrow enough to do not interfere with Raman emission spectrum.

An other aspect of the invention is a measurement device for the detection and/or measurement of particles in a fluid, the measurement device comprising a fluid source for producing a flow of fluid along a fluid flow path, a first laser source positioned for emitting a first laser beam of laser light in a measurement volume of the fluid flow path for light scattering, a scattered light detecting means for detecting a presence of a particle in the fluid flow path through detection and measurement of laser beam light scattered on different angles by the particle, characterized in that it further comprises a second laser source positioned for emitting a second laser beam of laser light in the measurement volume of the fluid flow path for Raman and fluorescence excitation, a Raman and fluorescence detecting means for detecting a Raman scattering signal emitted by the fluid and a Fluorescence signal emitted by the particle upon excitation by the second laser beam.

According to a preferred embodiment of the present invention, the second laser source is triggered only upon detection of light scattering by the scattered light detecting means.

Advantageously, the fluid source is a nozzle for producing a flow of water droplets with a flow path beyond the nozzle.

Preferably, the fluid source comprises a tube for producing a flow of water droplets with a flow path along the tube.

According to a preferred embodiment of the present invention, the measurement device further comprises a first lens set for collecting a first laser light scattered in the measurement volume by particles contained in the flow of fluid.

Advantageously, the first lens set is configured for focusing the scattered light in a line at a focal distance of the lens set, the line being transverse to a flow direction of the flow of fluid in the measurement volume.

Preferably, the first lens set is configured for focusing the scattered light in a line by focusing the scattered light in a direction parallel to the flow direction and for making the rays of scattered light parallel to each other in a plane perpendicular to the flow direction.

According to a preferred embodiment of the present invention, the scattered light detecting means is a multipixel light scattering detector.

Advantageously, the measurement device further comprises a second lens set for collecting the Raman signal emitted by the fluid molecule and fluorescence signal emitted by the particle upon excitation by the second laser beam.

According to a preferred embodiment of the present invention, the Raman and fluorescence detecting means is a photo-detector positioned for the detection of laser light collected by the second lens set.

Preferably, the photo-detector is a linear multipixel detector for capturing the laser light focused by the lens set, wherein the linear multipixel detector is positioned at a distance from the focal distance of the lens set and oriented with its longitudinal axis parallel to the line.

Advantageously, the first laser source is configured for emitting a continuous laser beam.

Preferably, the first laser source is configured for emitting a laser beam having a wavelength in range of 200 to 800 nm According to a preferred embodiment of the present invention, the first laser source is configured for emitting a laser beam having an emission spectrum up to tens of nm.

Advantageously, the first laser source is configured for emitting a laser beam having an output optical power range from few mW up to few W Preferably, the second laser source is configured for emitting a pulsed laser beam.

According to a preferred embodiment of the present invention, the second laser source is configured for emitting a laser beam having a wave length of 200 to 450 nm.

Preferably, the second laser source is configured for emitting a laser beam having an optical peak power per pulse of more than few kW.

Advantageously, the second laser source is configured for emitting a laser beam having an emission spectrum of less than few nm.

According to a preferred embodiment of the present invention, the measurement device further comprises a diffraction grating for wavelength separation.

A second aspect of the invention is a measurement method for the detection and/or analysis of fluid-borne particles, comprising the steps of producing a flow of fluid along a fluid flow path, the flow of fluid potentially containing fluid-borne particles to be detected, emitting a first beam of laser light in a measurement volume of the fluid flow path; collecting the laser light scattered in the measurement volume by fluid-borne particles contained in the flow of fluid and focusing the scattered light in a line, detecting the scattered laser light with a scattered light detecting means and acquiring a of light scattering pattern, emitting a second beam of laser light in a measurement volume of the fluid flow path; collecting the laser light scattered in the measurement volume by particles contained in the flow of fluid and focusing the scattered light in a line, detecting the scattered laser light with a Raman and fluorescence detecting means and acquiring Raman signal intensities and fluorescence signal intensities and calculating the measured number of impurities particles. The particular advantages of this device of the invention being similar to the ones of the method of the first aspect of the invention, they will not be repeated here.

According to a preferred embodiment of the present invention, the measurement method comprises a correction factor calculation step by taking ratios between measured and expected number of Stocks photons. Thus, the measurement is even more accurate.

Advantageously, the measurement method comprises an impurity mass concentration calculation step. In this manner, one can have a precise indication of the impurity quantity within a droplet.

BRIEF DESCRIPTION OF THE DRAWINGS

Further particular advantages and features of the invention will become more apparent from the following non-limitative description of at least one embodiment of the invention which will refer to the accompanying drawings, wherein.

DETAILED DESCRIPTION OF THE INVENTION

The present detailed description is intended to illustrate the invention in a non-limitative manner since any feature of an embodiment may be combined with any other feature of a different embodiment in an advantageous manner.

As mentioned earlier, the described method and device of the present invention are intended for on-the-fly and instantaneous detection of presence and concentration measurement of organic molecules or mixture of organic molecules, preferably in aerosols of water droplets.

Basically, the method and the device of the present invention uses simultaneously three basic physical effects:
Angularly resolved light Mie scattering also known as elastic light scattering;
Raman scattering of water molecules also know is inelastic light scattering;
Laser induced fluorescence.

More particularly, the method uses elastic light scattering and fluorescence emission to estimate the quantity of impurities molecules present inside water droplet. On the other hand, the Raman scattering is used as a reference signal to correct eventual error due to particle position in a laser beam, nonhomogeneous laser beam intensity, or any other factors influencing light collection efficiency.

Figure 1:
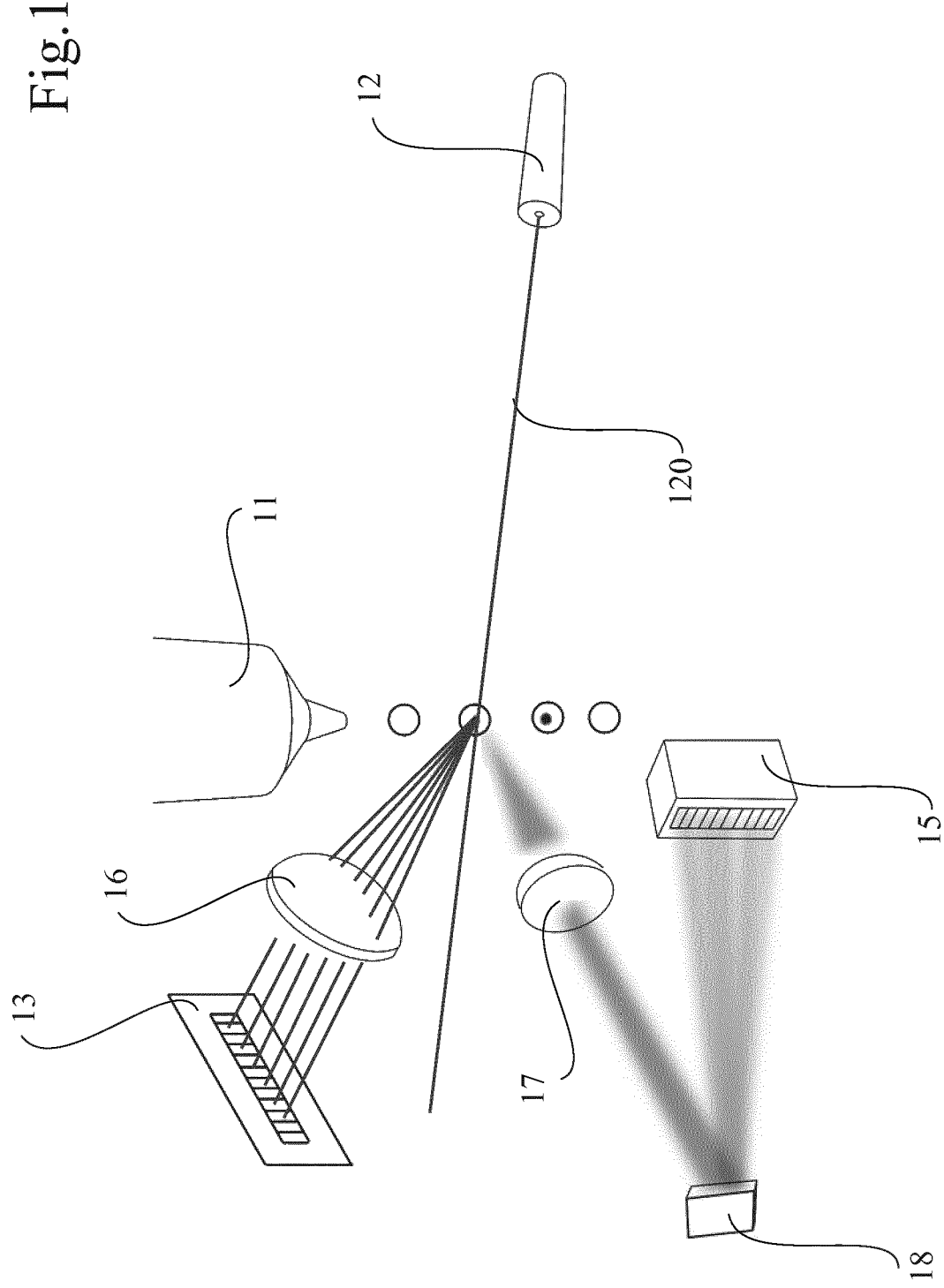
FIG. 1 represents a measurement device according to a first embodiment of the present invention

FIG. 1 with single laser shows a schematic view of an implementation of the device 1 according to a first embodiment of the present invention which is a measurement device 1 for the detection and/or measurement of particles in a fluid, and comprising a fluid source 11 for producing a flow of fluid 111 along a fluid flow path which can be a nozzle for producing a flow of water droplets with a flow path beyond the nozzle, or which can comprise a tube for producing a flow of water droplets with a flow path along said tube. More particularly, the measurement device 1 preferably comprises a single laser source 12, preferably a continuous laser source, which is used for light scattering, Raman and fluorescence excitation.

The first laser source 12 is positioned for emitting a, preferably continuous, laser beam 120 of laser light having a wave length of 200 to 450 nm, preferably 200 to 400 nm, a narrow emission spectrum up to tens of nm and the output optical power ranges from hundreds mW up to tens of W in a measurement volume of the fluid flow path. A short, UV-region, central emission wavelength of this laser is necessary since it efficiently induce a fluorescence response from organic molecules. Moreover, shorter wavelengths are much more efficient for Raman scattering excitation ($\sim\lambda^4$) as well. The laser source 12 preferably also has a narrow emission spectrum, e.g. less than few nm.

It also comprises a scattered light detecting means 13, which is preferably a multipixel light scattering detector, for detecting a presence of a particle in the fluid flow path through detection and measurement of laser beam light scattered on different angles by said particle and a Raman and fluorescence detecting means 15 for detecting a Raman scattering signal emitted by the fluid and a Fluorescence signal emitted by said particle upon excitation by said laser beam 120.

Also, it further comprises a first lens set 16 for collecting a first laser light 121 scattered in the measurement volume by particles contained in the flow of fluid 111 which is preferably configured for focusing the scattered light 121 in a line at a focal distance f2 of the lens set 16, where the line is transverse to a flow direction of the flow of fluid in said measurement volume.

Also, the first lens set 16 is configured for focusing said scattered light in a line by focusing said scattered light in a direction parallel to said flow direction y and for making the rays of scattered light parallel to each other in a plane perpendicular to the flow direction.

Further, it comprises a second lens set 17 for collecting the Raman signal emitted by the fluid molecule and fluorescence signal emitted by the particle upon excitation by the laser beam 120. Preferably, the Raman and fluorescence detecting means 15 is a photo-detector positioned for the detection of laser light 141 collected by the second lens set 17.

Figure 2:
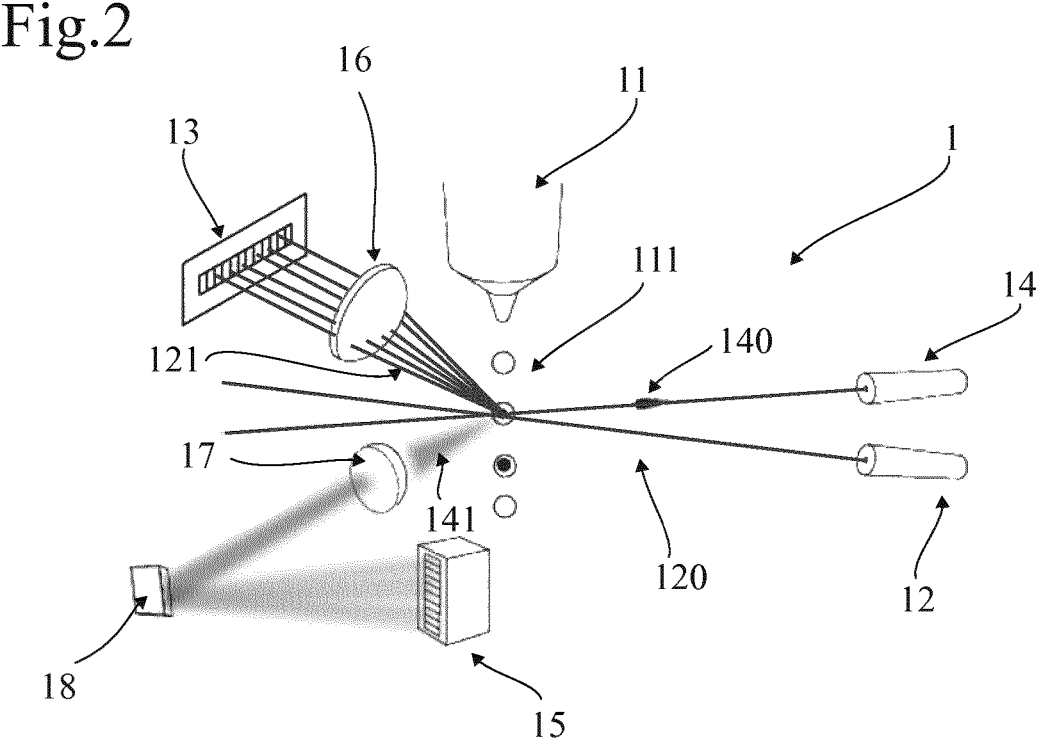
FIG. 2 represents a measurement device according to a second embodiment of the present invention

FIG. 2 shows a schematic view of an implementation of the device 1 according to a second embodiment of the present invention, based on method of the present invention where 11 is an injection nozzle, 13 is a multipixel light scattering detector, 16 is a collection lens for light scattering signal; 17 is a collection lens for Raman and fluorescence signals, 18 is a diffraction grating for wavelength separation, 15 is a multipixel Raman and fluorescence signal detector, 12 is a laser for light scattering, 14 is a laser for Raman and fluorescence excitation.

More particularly, the measurement device 1 of the present invention preferably comprises a first laser source 12, preferably a continuous laser source, which is used for light scattering and a second laser source 14, preferably a pulsed laser source, for Raman and fluorescence excitation.

The first laser source 12 can have any central wavelength such as from 300 to 800 nm, for example, and a relatively broad emission spectrum, e.g. up to tens of nm, since it is only used for the light scattering. The output optical power preferably ranges from few mW up to hundreds of mW.

The second laser source 14 preferably presents UV or deep-UV wavelength such as from 200 up to 450 nm, for example, and a high optical peak power per pulse, preferably more than few kW. The second laser source 14 preferably presents a short wavelength which is necessary since it efficiently induce a fluorescence response from organic molecules. Moreover, shorter wavelengths are much more efficient for Raman scattering excitation ($\sim\lambda^4$) as well. The second laser source 14 preferably also has a narrow emission spectrum, e.g. less than few nm.

The measurement device 13 of the present invention also preferably comprises a detector for detecting the presence of an individual particle in the beam of the first laser source 12 and measures the light scattered on different angles. At the same moment, when a particle is detected, the second laser source 14 shots with a single pulse, or multiple pulses, on the particle, which induces Raman scattering on water molecules and fluorescence emission organic impurities if there are present in the droplet.

The following paragraphs will now more precisely describe the measurement method carried out by the above described device. In addition to the control of the laser sources of the device, the measurement method of the present invention comprises a light scattering measurement step, a Raman scattering detection step and a fluorescence measurement step.

Figure 3:
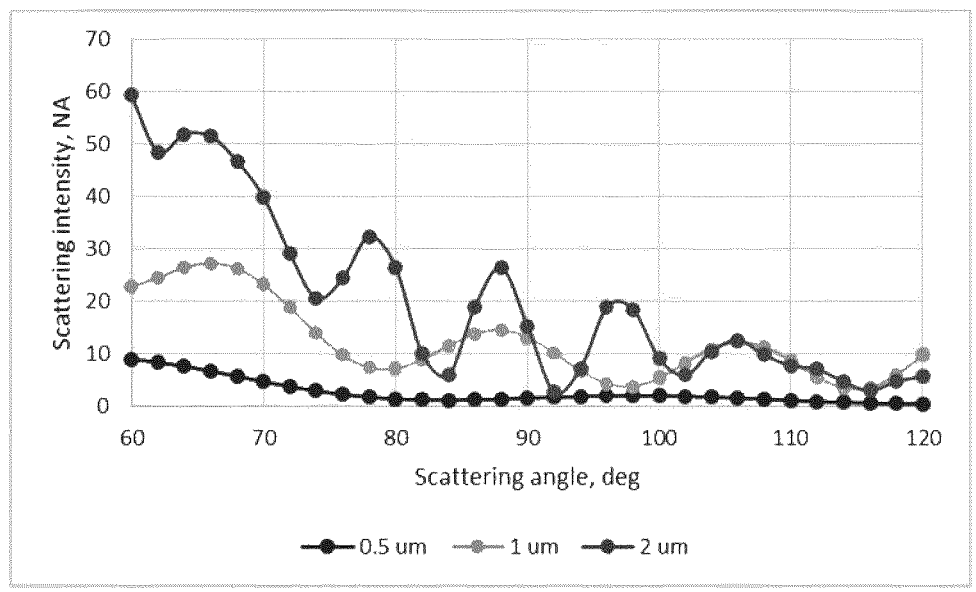
FIG. 3 represents an example of expected light scattering pattern from spherical particles of 0.5, 1, and 2 um diameters, refractive index of water is 1.331.

The light scattering measurement preferably consists in a Mie light scattering. Mie light scattering is a commonly used and very powerful tool for precise measurement of microparticle. The light scattering measurement of the method preferably uses a multipixel detector D1 to measure scattered light, preferably in the range of angles of 60 deg to 120 deg (side scattering) with respect to the laser direction, with unpolarized, or circularly polarized laser source S1 with resolution of 2 deg/pixel, then the expected scattering patterns will look like on the graph shown in FIG. 3, which shows an example of expected light scattering pattern from spherical particles of 0.5, 1, and 2 um diameters, refractive index of water is 1.331.

In addition, this step preferably uses advanced pattern recognition algorithms such as gradient boosting trees or support vector machine, where one can extract very precise size estimation (+/−0.1 µm).

Such measurement allows instantaneous and precise estimation of equivalent optical diameter. Considering that water droplets have always perfect spherical shape due to the surface tension, this measurement provides direct droplet size and volume estimation. Using standard water density 1000 kg/m$^3$ and molecular mass around $3\times10^{-26}$ kg/molecule, one can also estimate the droplet mass and approximate number of H$_2$O molecules thanks to the following equation:

$$N_{mol} = \frac{\frac{4}{3}*\pi*D^3*\rho_w}{3*10^{-26}}$$

Where D is the measured particle diameter and $\rho_w$ is the water mass density.

The second step of the method is a Raman scattering detection. In this step, the second laser source S2 is a pulsed laser which emits laser pulsed which hit the droplet to induce Raman scattering. The number of Stocks photons (photons resulted from Raman scattering) detected on the detector D2 can be estimated according following equation:

$$N_{St} = \sigma_R(3m-6)N_{mol}\frac{E}{Ah\nu}\sigma_D$$

Where $\sigma_R$ is the Raman scattering cross section, typically $10^{-29}$ for resonant scattering and $10^{-33}$ for non-resonant scattering, m is the number of atoms in molecule, $N_{mol}$ is the number of H$_2$O molecules, E is the laser (S2) pulse energy, A is the cross section of the laser (S2), h is the Plank constant, ν is the frequency of electromagnetic field of the laser (S2) and $\sigma_D$ is the detection efficiency of the optical system (L2+G1+D2).

Figure 4:
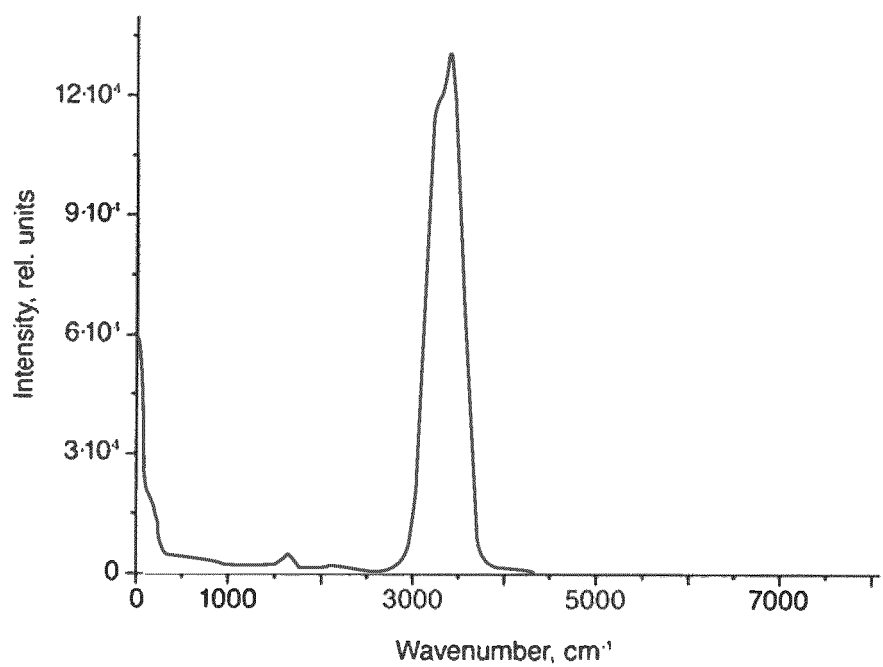
FIG. 4 schematically represents a typical Raman emission spectrum of distilled water.

To give a rough estimation of number of expected photons from a water droplet of 1 µm in diameter, one does the following assumptions:

The main contribution into Raman spectrum of water comes from valent band at 3400 cm$^{-1}$. A typical spectrum presented in FIG. 4, which is a typical Raman emission spectrum of distilled water.

Preferably, the measurement is done with nitrogen laser source with, for example, an emission wavelength of 337 nm, in such a case most of the Stocks photons resulted from Raman scattering by a 1 µm water droplet will have wavelength around 380 nm, which is easily resolved by a diffraction grating G1 from the excitation wavelength of the laser.

As an example, this Raman emission is resonant so $$\sigma_R \approx 10^{-29}, m=3, N_{mol} = \frac{\frac{4}{3}*\pi*0.000001^3*1000}{3*10^{-26}} \approx 8*10^{10},$$

laser pulse energy is taken 100 µJ, laser cross section is $8*10^{-9}$ m$^2$ (corresponds to a focused beam of 100 µm in diameter), detection efficiency is taken as 10%. The result is around 5000 Stocks photons detected around 380 nm wavelength, which is a very significant number for modern detectors like vacuum tube photomultipliers and silicon photomultipliers (matrixes of avalanche photodiodes).

It is important to mention at this point that distilled water does not exhibit any fluorescence emission while excited in a wavelength range of 200-400 nm since water molecules do not have any π- or σ-electron orbitals that could absorb such photons.

So, if the water droplet does not contain any organic or other complex impurities, the only signal observed will be Raman scattering while excited with UV light.

The third measurement step is therefore a fluorescence measurement. Fluorescence emission is preferably estimated from the following equation:

$$N_{fl} = \sigma_A Q N_{mol}\frac{E}{Ah\nu}\sigma_D$$

Where $\sigma_A$ is the Photon absorption cross section, typically $10^{-20}$ for endogenous fluorophores, $N_{mol}$ is the number of fluorophore molecules (organic impurities), Q is the quantum efficiency of radioactive deexcitation of fluorophore, typically 10%, E is the laser (S2) pulse energy, A is the cross section of the laser (S2, h is the Plank constant, and ν is the frequency of electromagnetic field of the laser (S2), $\sigma_D$ is the detection efficiency of the optical system (L2+G1+D2).

Compared with Raman scattering, the fluorescence efficiency is much higher if measured under the same conditions. For example, if water droplet contains only 10$^5$ fluorophore molecules, it would already emit around 2*10$^5$ fluorescence photons spread over large rage of wavelengths (at the room temperature).

The last step of the method consists in a measurement of the concentration of the organic impurities in the droplet.

As mentioned before, the described method is intended for instantaneous measurement of organic impurities in water droplets. The whole process can therefore be split over following steps of producing a flow of fluid 111 along a fluid flow path, the flow of fluid potentially containing fluid-borne particles to be detected; emitting a first beam 120 of laser light in a measurement volume of the fluid flow path; collecting the laser light 121 scattered in the measurement volume by fluid-borne particles contained in the flow of fluid and focusing the scattered light in a line; detecting the scattered laser light 121 with a scattered light detecting means 13 and acquiring a of light scattering pattern; emitting a second beam 140 of laser light in a measurement volume of the fluid flow path; collecting the laser light 141 scattered in the measurement volume by particles contained in the flow of fluid and focusing the scattered light in a line; detecting the scattered laser light 141 with a Raman and fluorescence detecting means (15) and acquiring Raman signal intensities and fluorescence signal intensities; calculating the measured number of impurities particles.

The measured number of impurities molecules is preferably given by the following equation:

$$N_{im} = \frac{N_{St}^{exp} N_{fl}^{mes}}{N_{St}^{mes} \sigma_A Q \frac{E}{Ahv} \sigma_D} = \frac{\sigma_R (3m-6) N_{mol} \frac{E}{Ahv} \sigma_D N_{fl}^{mes}}{N_{St}^{mes} \sigma_A Q \frac{E}{Ahv} \sigma_D}$$

Where $N_{St}^{exp}$ is the expected number of Stocks photons coming from Raman scattering, $N_{St}^{mes}$ is the number of Stocks photons coming from Raman scattering, detected by the device, $N_{fl}^{mes}$ is the number of fluorescence photons detected by the device.

By inserting this equation with the first one above, the expression becomes:

$$N_{im} = \frac{\sigma_R (3m-6) N_{mol} \frac{E}{Ahv} \sigma_D N_{fl}^{mes}}{N_{St}^{mes} \sigma_A Q \frac{E}{Ahv} \sigma_D}$$

By simplifying this equation and applying the constants for H$_2$O, the expression takes the following form:

$$N_{im} = \frac{4 \sigma_R \pi D^3 \rho_w N_{fl}^{mes}}{M_w \sigma_A Q N_{St}^{mes}}$$

When the molecular mass of impurity is known, then the mass concentration can be estimated as well with the following equation:

$$m_{im} = N_{im} M_{im} \frac{4 \sigma_R \pi D^3 \rho_w M_{im} N_{fl}^{mes}}{\sigma_A Q N_{St}^{mes} M_w}$$

It can be noted that the result depends only on the number of measured photons from fluorescence emission and Raman scattering, and measured optical size in third power. It does not depend on the second laser energy or detection efficiency of the system. If one groups all the constants in this equation the expression becomes:

$$m_{im} = A \frac{D^3 N_{fl}^{mes}}{N_{St}^{mes}}$$

The resulting expression allows for simple and straightforward mass estimation of impurity molecules in each water droplet detected by the described device.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This for example particularly the case regarding the different apparatuses which can be used.

The invention claimed is:

1. Measurement device for the detection and/or measurement of particles in a fluid, the measurement device comprising:
   a fluid source configured to produce a flow of fluid along a fluid flow path,
   a laser source positioned for emitting a laser beam of laser light in a measurement volume of the fluid flow path;
   a first lens set configured to collect a first laser light scattered in the measurement volume by particles contained in the flow of fluid;
   a scattered light detecting means configured to detect a presence of a particle in the fluid flow path through detection and measurement of laser beam light scattered on different angles by said particle,
   characterized in that it further comprises
   a Raman and fluorescence detecting means configured to detect a Raman scattering signal emitted by the fluid and a Fluorescence signal emitted by said particle upon excitation by said laser beam,
   wherein said first lens set is configured for focusing the scattered light in a line at a focal distance of the lens set, said line being transverse to a flow direction of the flow of fluid in said measurement volume and wherein said first lens set is configured for focusing said scattered light in a line by focusing said scattered light in a direction parallel to said flow direction and for making the rays of scattered light parallel to each other in a plane perpendicular to said flow direction
   further comprising a second lens set for collecting the Raman signal emitted by the fluid molecule and fluorescence signal emitted by the particle upon excitation by said laser beam,
   wherein the Raman and fluorescence detecting means is a photo-detector positioned for the detection of laser light collected by the second lens set,
   wherein the photo-detector is a linear multipixel detector configured for capturing the laser light focused by the lens set, wherein said linear multipixel detector is positioned at a distance from the focal distance of the lens set and oriented with its longitudinal axis parallel to said line.

2. Measurement device according to claim 1, wherein said fluid source is a nozzle configured to produce a flow of water droplets with a flow path beyond the nozzle.

3. Measurement device according to claim 1, wherein said fluid source comprises a tube configured to produce a flow of water droplets with a flow path along said tube.

4. Measurement device according to claim 1, wherein the scattered light detecting means is a multipixel light scattering detector.

5. Measurement device according to claim 1, wherein said laser source is configured for emitting a continuous laser beam.

6. Measurement device according to claim 1, wherein said laser source is configured for emitting a laser beam having a wave length of 200 to 800 nm.

7. Measurement device according to claim 1, wherein said laser source is configured for emitting a laser beam having an emission spectrum up to tens of nm.

8. Measurement device according to claim 1, wherein said laser source is configured for emitting a laser beam having an output optical power range from mW up to W.

9. Measurement device according to claim 1, further comprising a second laser source positioned for emitting a second laser beam of laser light in said measurement volume of the fluid flow path for Raman and fluorescence excitation while the laser source is configured for light scattering only.

10. Measurement device according to claim 9, wherein said second laser source is configured for emitting a pulsed laser beam.

11. Measurement device according to claim 9, wherein said second laser source is configured for emitting a laser beam having a wave length of 200 to 450 nm.

12. Measurement device according to claim 9, wherein said second laser source is configured for emitting a laser beam having an optical peak power per pulse of more than kW.

13. Measurement device according to claim 9, further comprising a diffraction grating for wavelength separation.

14. Measurement method for the detection and/or analysis of fluid-borne particles, comprising the steps of:
   producing a flow of fluid along a fluid flow path, said flow of fluid potentially containing fluid-borne particles to be detected;
   emitting a beam of laser light in a measurement volume of the fluid flow path;
   collecting said laser light scattered in the measurement volume by fluid-borne particles contained in the flow of fluid and focusing said scattered light in a line;
   detecting said scattered laser light with a scattered light detecting means and acquiring a of light scattering pattern;
   collecting said laser light scattered in the measurement volume by particles contained in the flow of fluid with a first lens set and focusing said scattered light in a line at a focal distance of the lens set, said line being transverse to a flow direction of the flow of fluid in said measurement volume and in a direction parallel to said flow direction and making the rays of scattered light parallel to each other in a plane perpendicular to said flow direction;
   detecting said scattered laser light with a Raman and fluorescence detecting means and acquiring Raman signal intensities and fluorescence signal intensities; and
   calculating the measured number of impurities particles,
   further comprising collecting the Raman signal emitted by the fluid molecule and fluorescence signal emitted by the particle upon excitation by said laser beam with a second lens set,
   wherein the Raman and fluorescence detecting means is a photo-detector positioned for the detection of laser light collected by the second lens set,
   wherein the photo-detector is a linear multipixel detector configured for capturing the laser light focused by the lens set, wherein said linear multipixel detector is positioned at a distance from the focal distance of the lens set and oriented with its longitudinal axis parallel to said line.

* * * * *